(12) United States Patent
Goldenberg et al.

(10) Patent No.: US 7,233,476 B2
(45) Date of Patent: Jun. 19, 2007

(54) ACTUATOR THERMAL PROTECTION IN HAPTIC FEEDBACK DEVICES

(75) Inventors: Alex S. Goldenberg, Mountain View, CA (US); Adam C. Braun, Sunnyvale, CA (US); Paul D. Batcheller, Tuscon, AZ (US)

(73) Assignee: Immersion Corporation, San Jose, CA (US)

( * ) Notice: Subject to any disclaimer, the term of this patent is extended or adjusted under 35 U.S.C. 154(b) by 408 days.

(21) Appl. No.: 09/927,416

(22) Filed: Aug. 10, 2001

(65) Prior Publication Data

US 2002/0126432 A1 Sep. 12, 2002

Related U.S. Application Data

(60) Provisional application No. 60/224,690, filed on Aug. 11, 2000.

(51) Int. Cl.
*H01H 47/00* (2006.01)

(52) U.S. Cl. .................................. 361/140; 361/152
(58) Field of Classification Search ............... 345/160, 345/161; 361/58, 93.8, 103, 106, 140, 146, 361/152, 154, 78.07; 318/432, 641
See application file for complete search history.

(56) References Cited

U.S. PATENT DOCUMENTS

| | | |
|---|---|---|
| 2,972,140 A | 2/1961 | Hirsch |
| 3,157,853 A | 11/1964 | Hirsch |
| 3,220,121 A | 11/1965 | Culter |
| 3,497,668 A | 2/1970 | Hirsch |
| 3,517,446 A | 6/1970 | Corlyon et al. |
| 3,623,064 A | 11/1971 | Kagan |

(Continued)

FOREIGN PATENT DOCUMENTS

| | | |
|---|---|---|
| EP | 0 349 086 A1 | 1/1990 |
| JP | H2-185278 | 7/1990 |
| JP | H4-8381 | 1/1992 |
| JP | H5-192449 | 8/1993 |
| JP | H7-24147 | 1/1995 |

OTHER PUBLICATIONS

Baigrie, "Electric Control Loading—A Low Cost, High Performance Alternative," *Proceedings of Interservice/Industry Training Systems Conference*, pp. 247–254, Nov. 6–8, 1990.

Iwata, "Pen-based Haptic Virtual Environment," 0-7803-1363-1/93 IEEE, pp. 287–292, 1993, no month.

Russo, "The Design and Implementation of a Three Degree of Freedom Force Output Joystick," *MIT Libraries Archives* pp. 1–131, May 1990, archived Aug. 14, 1990.

Brooks et al., "Hand Controllers for Teleoperation—A State-of-the-Art Technology Survey and Evaluation," *JPL Publication 85/11*, NASA–CR–175890; N85–28559, pp. 1–84, Mar. 1, 1985.

(Continued)

*Primary Examiner*—Jessica Han
(74) *Attorney, Agent, or Firm*—Thelen Reid Brown Raysman & Steiner LLP; David B. Ritchie

(57) ABSTRACT

Method and apparatus for providing thermal protection for actuators used in haptic feedback interface devices. An average energy in the actuator over a predetermined period of time is determined, and the maximum allowable current level in the actuator is reduced if the average energy is determined to exceed a predetermined warning energy level. The maximum allowable current level can be reduced to a sustainable current level if the average energy reaches a maximum energy level allowed, and the maximum allowable current level in the actuator can be raised if the average energy is determined to be below the predetermined warning energy level. Preferably, the maximum allowable current level is reduced smoothly as a ramp function.

24 Claims, 6 Drawing Sheets

U.S. PATENT DOCUMENTS

| | | | |
|---|---|---|---|
| 3,902,687 | A | 9/1975 | Hightower |
| 3,903,614 | A | 9/1975 | Diamond et al. |
| 3,911,416 | A | 10/1975 | Feder |
| 4,127,752 | A | 11/1978 | Lowthorp |
| 4,160,508 | A | 7/1979 | Salisbury, Jr. |
| 4,236,325 | A | 12/1980 | Hall et al. |
| 4,262,549 | A | 4/1981 | Schwellenbach |
| 4,333,070 | A | 6/1982 | Barnes |
| 4,464,117 | A | 8/1984 | Foerst |
| 4,484,191 | A | 11/1984 | Vavra |
| 4,513,235 | A | 4/1985 | Acklam et al. |
| 4,581,491 | A | 4/1986 | Boothroyd |
| 4,599,070 | A | 7/1986 | Hladky et al. |
| 4,708,656 | A | 11/1987 | de Vries et al. |
| 4,713,007 | A | 12/1987 | Alban |
| 4,794,392 | A | 12/1988 | Selinko |
| 4,885,565 | A | 12/1989 | Embach |
| 4,891,764 | A | 1/1990 | McIntosh |
| 4,930,770 | A | 6/1990 | Baker |
| 4,934,694 | A | 6/1990 | McIntosh |
| 5,019,761 | A | 5/1991 | Kraft |
| 5,022,384 | A | 6/1991 | Freels |
| 5,022,407 | A | 6/1991 | Horch et al. |
| 5,035,242 | A | 7/1991 | Franklin et al. |
| 5,038,089 | A | 8/1991 | Szakaly |
| 5,078,152 | A | 1/1992 | Bond et al. |
| 5,165,897 | A | 11/1992 | Johnson |
| 5,175,459 | A | 12/1992 | Danial et al. |
| 5,186,695 | A | 2/1993 | Mangseth et al. |
| 5,212,473 | A | 5/1993 | Louis |
| 5,240,417 | A | 8/1993 | Smithson et al. |
| 5,271,290 | A | 12/1993 | Fischer |
| 5,275,174 | A | 1/1994 | Cook |
| 5,283,970 | A | 2/1994 | Aigner |
| 5,299,810 | A | 4/1994 | Pierce et al. |
| 5,309,140 | A | 5/1994 | Everett, Jr. et al. |
| 5,334,027 | A | 8/1994 | Wherlock |
| 5,436,622 | A | 7/1995 | Gutman et al. |
| 5,437,607 | A | 8/1995 | Taylor |
| 5,466,213 | A | 11/1995 | Hogan et al. |
| 5,547,382 | A | 8/1996 | Yamasaki et al. |
| 5,575,761 | A | 11/1996 | Hajianpour |
| 5,690,582 | A | 11/1997 | Ulrich et al. |
| 5,766,016 | A | 6/1998 | Sinclair et al. |
| 5,785,630 | A | 7/1998 | Bobick et al. |
| 6,111,577 | A | 8/2000 | Zilles et al. |
| 6,160,489 | A | 12/2000 | Perry et al. |
| 6,422,941 | B1 | 7/2002 | Thorner et al. |
| 2002/0126091 | A1 * | 9/2002 | Rosenberg et al. ......... 345/161 |

OTHER PUBLICATIONS

Jones et al., "A perceptual analysis of stiffness," ISSN 0014-4819 Springer International (Springer–Verlag); *Experimental Brain Research*, vol. 79, No. 1, pp. 150–156, 1990, no month.

Burdea et al., "Distributed Virtual Force Feedback, Lecture Notes for Workshop on Force Display in Virtual Environments and its Application to Robotic Teleoperation," *1993 IEEE International Conference on Robotics and Automation*, pp. 25–44, May 2, 1993.

Snow et al., Model–X Force–Reflecting–Hand–Controller, NT Control No. NPO–17851; JPL Case No. 7348, pp. 1–4 with 45 pages of attachments, Jun. 15, 1989.

Ouh–Young, "Force Display in Molecular Docking," Doctoral Dissertation, University of North Carolina at Chapel Hill, UMI Order No. 9034744, p. 1–369, 1990, no month.

Tadros, "Control System Design for a Three Degree of Freedom Virtual Environment Simulator Using Motor/Brake Pair Actuators," *MIT Archive*, pp. 1–88, Feb. 1990, archived Aug. 13, 1990.

Caldwell et al., "Enhanced Tactile Feedback (Tele–Taction) Using a Multi–Functional Sensory System," 1050-4729/93, pp. 955–960, 1993, no month.

Adelstein et al., "Design and Implementation of a Force Reflecting Manipulandum for Manual Control research," DSC–vol. 42, *Advances in Robotics*, pp. 1–12, 1992, no month.

Gotow et al., "Controlled Impedance Test Apparatus for Studying Human Interpretation of Kinesthetic Feedback," WA11–11:00, pp. 332–337, no date.

Stanley et al., "Computer Simulation of Interacting Dynamic Mechanical Systems Using Distributed Memory Parallel Processors," DSC–vol. 42, *Advances in Robotics*, pp. 55–61, ASME 1992, no month.

Russo, "Controlling Dissipative Magnetic Particle Brakes in Force Reflective Devices," DSC–vol. 42, *Advances in Robotics*, pp. 63–70, ASME 1992, no month.

Kontarinis et al., "Display of High–Frequency Tactile Information to Teleoperators," *Telemanipulator Technology and Space Telerobotics*, Won S. Kim, Editor, Proc. SPIE vol. 2057, pp. 40–50, Sep 7–9, 1993.

Patrick et al., "Design and Testing of A Non–reactive, Fingertip, Tactile Display for Interaction with Remote Environments," *Cooperative Intelligent Robotics in Space*, Rui J. deFigueiredo et al, Editor, Proc. SPIE vol. 1387, pp. 215–222, 1990, no month.

Adelstein, "A Virtual Environment System For The Study of Human Arm Tremor," *Ph.D. Dissertation*, Dept. of Mechanical Engineering, MIT, Jun. 1989, archived Mar. 13, 1990.

Bejczy, "Sensors, Controls, and Man–Machine Interface for Advanced Teleoperation," *Science*, vol. 208, No. 4450, pp. 1327–1335, 1980, no month.

Bejczy et al., "Generalization of Bilateral Force–Reflecting Control of Manipulators," *Proceedings Of Fourth CISM–IFToMM*, Sep. 8–12, 1981, no month.

McAfee et al., "Teleoperator Subsystem/Telerobot Demonstrator: Force Reflecting Hand Controller Equipment Manual," JPL 1988, JPL D–5172, no month.

Minsky, "Computational Haptics: The Sandpaper System for Synthesizing Texture for a Force–Feedback Display," *Ph.D. Dissertation*, MIT, Jun. 1995, archived Jul. 6, 1995.

Jacobsen et al., "High Performance, Dextrous Telerobotic Manipulator With Force Reflection," *Intervention/ROV '91 Conference & Exposition*, Hollywood, Florida, May 21–23, 1991.

Shimoga, "Finger Force and Touch Feedback Issues in Dexterous Telemanipulation," *Proceedings of Fourth Annual Conference on Intelligent Robotic Systems for Space Exploration*, Rensselaer Polytechnic Institute, Sep. 30–Oct. 1, 1992.

IBM Technical Disclosure Bulletin, "Mouse Ball–Actuating Device With Force and Tactile Feedback," vol. 32, No. 9B, Feb. 1990.

Terry et al., "Tactile Feedback In A Computer Mouse," *Proceedings of Fourteenth Annual Northeast Bioengineering Conference, University of New Hampshire*, Mar. 10–11, 1988.

Howe, "A Force–Relating Teleoperated Hand System for the Study of Tactile Sensing in Precision Manipulation," *Proceedings of the 1992 IEEE International Conference on Robotics and Automation*, Nice, France, May 1992.

Eberhardt et al., "OMAR—A Haptic display for speech perception by deaf and deaf–blind individuals," *IEEE Virtual Reality Annual International Symposium*, Seattle, WA, Sep. 18–22, 1993.

Rabinowitz et al., "Multidimensional tactile displays: Identification of vibratory intensity, frequency, and contractor area," *Journal of The Acoustical Society of America*, vol. 82, No. 4, Oct. 1987.

Bejczy et al., "Kinestetic Coupling Between Operator and Remote Manipulator," *International Computer Technology Conference, The American Society of Mechanical Engineers*, San Francisco, CA, Aug. 12–15, 1980.

Bejczy et al., "A Laboratory Breadboard System For Dual–Arm Teleoperation," *SOAR '89 Workshop, JSC*, Houston, TX, Jul. 25–27, 1989.

Ouhyoung et al., "A Low–Cost Force Feedback Joystick and ITs Use in PC Video Games," *IEEE Transactions on Consumer Electronics*, vol. 41, No. 3, Aug. 1995.

Marcus, "Touch Feedback in Surgery," *Proceedings of Virtual Reality and Medicine The Cutting Edge*, Sep. 8–11, 1994.

Bejczy, et al., "Universal Computer Control System (UCCS) For Space Telerobots," CH2413–3/87/0000/0318501.00 1987 IEEE, 1987, no month.

"Technical manual Overhaul Instructions with parts Breakdown, Coaxial Control Shaker PArt. No. C–25502", Safe Flight Instrument Corporation, Revised Jul. 15, 1980 (23 pages).

Scannell T., "Taking a Joystick Ride", Computer Currents, Boston Edition, vol. 9, No. 11, Nov. 1994.

Yamakita, M. et al., "Tele–Virtual Reality of Dynamic Mechanical Model", Proceedings of the 1992 IEEE/RSJ International Conference on Intelligent Robots and Systems, Raleigh, NC, Jul. 7–10, 1992.

Noll, M., "Man–Machine Tactile", Reprinted from SID Journal, Jul./Aug. 1972 Issue.

Rosenberg, L.B., "Virtual Fixtures: Perceptual Overlays Enhance Operator Performance in Telepresence Tasks, "Ph.D. Dissertation, Stanford University, Aug. 1994.

Patrick, N., "Design, Construction, and Testing of a Fingertip Tactile Display for Interaction with Virtual and Remote Environments", Master of Science Thesis, MIT, Aug. 1990, archived Nov. 8, 1990.

Calder, B., "Design of a Force–Feedback Touch–Inducing Actuator for Teleoperator Robot Control", Bachelor of Science Thesis, MIT, May 1983, archived Jun. 23, 1983.

Wiker, S., "Teletouch Display Development: Phase 1 Report", Technical Report 1230, Naval Ocean Systems Center, San Diego, Jul. 1988.

Bliss, J. et al., "Optical–to–Tactile Image Conversion for the Blind", IEEE Transactions on Man–Machine Systems, vol. MMS–11, No. 1, Mar. 1970.

Johnson, A., "Shape–Memory Alloy Tactile Feedback Actuator", Armstrong Aerospace Medical Research Laboratory, AAMRL–TR–90–039, Aug. 1990.

Kontatarinis, D. et al., "Tactile Display of Vibratory Information in Teleoperation and Virtual Environments", Presence, vol. 4, No. 4, 387–402, 1995.

Aukstakalnis, S. et al., "Silicon Mirage: The Art and Science of Virtual Reality", ISBN 0–938151–82–7, pp. 129–180, 1992.

Eberhardt, S. et a., "Inducing Dynamic Haptic Perception by the Hand: System Description and Some Results", DSC–vol. 55–1, Dynamic Systems and Control, vol. 1, ASME, 1994.

Gobel, M. et al., "Tactile Feedback Applied to Computer Mice", International Journal of Human–Computer Interaction, vol. 7, No. 1, pp. 1–24, 1995.

Pimental, K. et al., "Virtual Reality: Through the New Looking Glass", $2^{nd}$ Edition, McGraw–Hill, ISBN 0–07–050167–X, pp. 41–202, 1994.

"Cyberman Technical Specification", Logitech Cyberman Swift Supplemental to Logitech Mouse Technical Reference and Programming Guide, Apr. 5, 1994.

Ouhyoung, M. et al., "The Development of a Low–Cost Force Feedback Joystick and Its Use in the Virtual Environment", Proceedings of the Third Pacific Conference on Computer Graphics and Applications, Pacific Graphics '95, Seoul, Korea, Aug. 21–24, 1995.

Kaczmarek, K. et al., "The Tactile Displays", Virtual Environments and Advanced Ingergace Design, Chapter 9, pp. 349–414, 1995.

Lake, L., "Cyberman from Logitech", printed from http://www.ibiblio.org/GamesBytes/issue21/greviews/cyberman.html, 1994.

"Component Maintenance Manual with Illustrated Parts List, Coaxial Control Shaker, Part No. C25502", Safe Flight Instrument Corporation, Revised Jan. 28, 2002 (3 pages).

\* cited by examiner

ACTUATOR THERMAL PROTECTION IN HAPTIC FEEDBACK DEVICES

CROSS REFERENCE TO RELATED APPLICATIONS

This application claims the benefit of Provisional Patent Application No. 60/224,690, filed Aug. 11, 2000 by Goldenberg et al., entitled, "Actuator Thermal Protection," and which is incorporated herein by reference for all purposes.

BACKGROUND OF THE INVENTION

The present invention relates generally to actuators, and more particularly to actuators used in computer interface devices that allow the user to provide input to computer systems and allow computer systems to provide haptic feedback to the user.

A user can interact with a computer to perform functions and tasks on the computer, such as playing a game, experiencing a simulation or virtual reality environment, using a computer aided design system, operating a graphical user interface (GUI), navigate web pages, etc. Common human-computer interface devices used for such interaction include a mouse, joystick, trackball, gamepad, steering wheel, stylus, tablet, pressure-sensitive sphere, knob, or the like, that is connected to the computer system controlling the displayed environment. In some interface devices, kinesthetic force feedback and/or tactile feedback is also provided to the user, more generally known collectively herein as "haptic feedback." These types of interface devices can provide physical sensations which are felt by the user manipulating a user manipulandum of the interface device, such as a joystick handle, mouse, wheel, etc. One or more motors or other actuators are coupled to the manipulandum and are connected to the controlling computer system. The computer controls forces on the manipulandum and/or device housing in conjunction and coordinated with displayed events and interactions by sending control signals or commands to the actuators. The computer system can thus convey physical force sensations to the user in conjunction with other supplied feedback as the user is grasping or contacting the interface device or manipulatable object of the interface device.

A problem with many types of haptic feedback interface devices, such as haptic knobs, joysticks, and other types of devices, is protecting the actuator(s) of the device from failure due to high temperatures. For example, moving-coil DC motors in haptic feedback devices are typically stalled at high currents, and so have the potential to heat up quickly. For example, a haptic feedback device may output a barrier force or other resistive force, where the user moves a manipulandum in direct opposition to the output force. This can cause excessive heat in an actuator.

A robust haptic feedback product must protect its actuators against excessive coil and magnet temperatures. This problem can be solved by mounting a thermistor directly on the motor coil and using its information to safely regulate temperature. However, it is impossible to mount a thermistor on the moving coil of a typical brushed motor. Other ways must be employed to predict and prevent destructive coil temperatures in brushed motors. More cost effective ways to prevent such temperatures in brushed motors and other types of actuators are also needed.

SUMMARY OF THE INVENTION

The present invention is directed toward providing thermal protection for actuators used in haptic feedback interface devices.

More particularly, a method for providing thermal protection for an actuator in a haptic feedback device includes determining an average energy in the actuator over a predetermined period of time, and reducing the maximum allowable current level in the actuator if the average energy is determined to exceed a predetermined warning energy level. The average energy can be determined over time by repeatedly moving an energy window by a predetermined timeslice and determining an average energy within the energy window after each of the movements. The maximum allowable current level can be reduced to a sustainable current level if the average energy reaches a maximum energy level allowed, where the actuator can operate indefinitely without overheating at the sustainable current level. The maximum allowable current level in the actuator can also be raised after its has been reduced if the average energy is determined to be below the predetermined warning energy level. Preferably, the maximum allowable current level is reduced gradually as a ramp function and as a function of the energy by which the predetermined warning energy level has been exceeded.

In another aspect of the present invention, a haptic interface device is in communication with a host computer implementing a host application program and includes a sensor device operative to detect a manipulation of the interface device by the user, at least one actuator operative to output force to the user, and a controller that determines an average energy in the actuator over a predetermined period of time as the actuator outputs the forces, and reduces the maximum allowable current level in the actuator if the average energy is determined to exceed a predetermined warning energy level. The controller can reduce the maximum allowable current level to a sustainable current level, and can raise the maximum allowable current level in the actuator if the average energy is determined to be below the predetermined warning energy level. The controller can be a microprocessor local to the haptic feedback device and separate from the host computer. A positive temperature coefficient (PTC) resettable fuse can also be provided in a current path of the actuator, where the fuse opens to stop a flow of the current when the current increases to a fuse threshold level.

The present invention advantageously provides thermal protection for actuators used in a haptic feedback interface device. The invention allows smooth, high magnitude forces to be output to the user to convey high fidelity haptic sensations without allowing the actuators to overheat due to excessive power consumption during operation of the actuators at stall.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
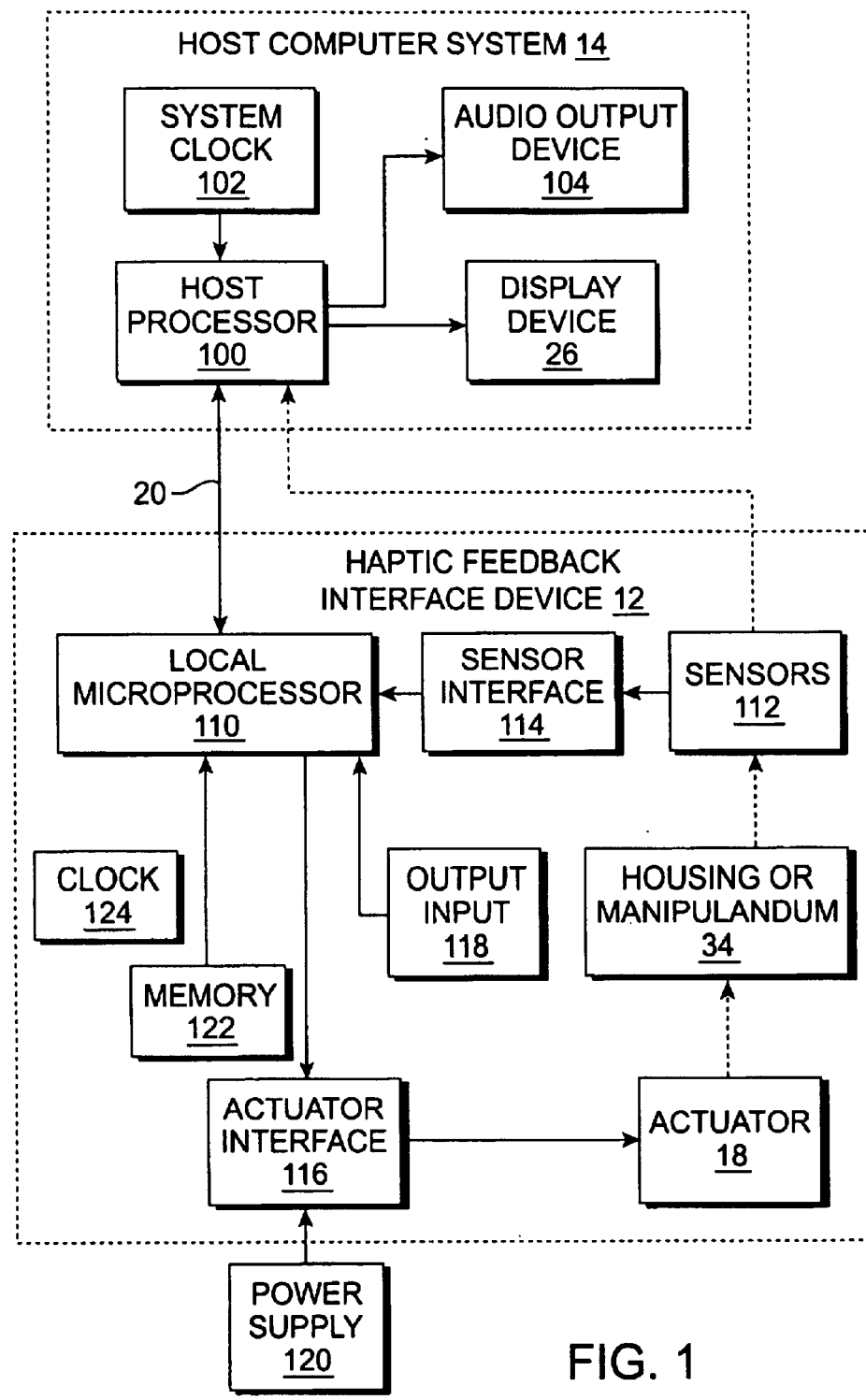
FIG. 1 is a block diagram illustrating a haptic feedback system suitable for use with the present invention.

FIG. 1 is a block diagram illustrating a haptic feedback system suitable for use with the described embodiments of the present invention. The haptic feedback system includes a host computer system 14 and interface device 12.

Host computer system 14 preferably includes a host microprocessor 100, a clock 102, a display screen 26, and an audio output device 104. The host computer also includes other well known components, such as random access memory (RAM), read-only memory (ROM), and input/output (I/O) electronics (not shown).

Host computer 14 can be a personal computer or workstation and may operate under any well-known operating system. Or, host computer system 14 can be one of a variety of home video game console systems commonly connected to a television set or other display, such as systems available from Nintendo, Sega, Sony, or Microsoft. In other embodiments, host computer system 14 can be a "set top box" which can be used, for example, to provide interactive television functions to users, or a "network-" or "internet-computer" which allows users to interact with a local or global network using standard connections and protocols such as used for the Internet and World Wide Web. In other implementations, the host computer can be an appliance or electronic device, vehicle computer, arcade game, portable computer, etc.

Host computer 14 preferably implements a host application program with which a user is interacting via interface device 12 which includes haptic feedback functionality. For example, the host application program can be a video game, word processor or spreadsheet, Web page or browser that implements HTML or VRML instructions, scientific analysis program, virtual reality training program or application, or other application program that utilizes input of mouse 12 and outputs force feedback commands to the device 12. Herein, for simplicity, operating systems such as Windows™, MS-DOS, MacOS, Linux, Be, etc. are also referred to as "application programs." Herein, computer 14 may be referred as providing a "graphical environment," which can be a graphical user interface, game, simulation, or other visual environment, and include graphical objects, which are displayed by display device 26. Suitable software drivers which interface such software with computer input/output (I/O) devices are available from Immersion Corporation of San Jose, California.

Display device 26 can be included in host computer 14 and can be a standard display screen (LCD, CRT, flat panel, etc.), 3-D goggles, or any other visual output device. Typically, the host application provides images to be displayed in a graphical environment on display device 26 and/or other feedback, such as auditory signals. Audio output device 104, such as speakers, is preferably coupled to host microprocessor 100 via amplifiers, filters, and other circuitry well known to those skilled in the art and provides sound output to user when an "audio event" occurs during the implementation of the host application program. Other types of peripherals can also be coupled to host processor 100, such as storage devices (hard disk drive, CD ROM drive, floppy disk drive, etc.), printers, and other input and output devices.

Interface device 12 is coupled to the computer 14 by a bus 20, which communicates signals between device 12 and computer 14 and may also, in some embodiments, provide power to the device 12. In other embodiments, signals can be sent between device 12 and computer 14 by wireless transmission/reception. In some embodiments, the power for the actuator can be supplemented or solely supplied by a power storage device provided on the device, such as a capacitor or one or more batteries. The bus 20 is preferably bi-directional to send signals in either direction between host 14 and device 12. Bus 20 can be a serial interface bus, such as an RS232 serial interface, RS-422, Universal Serial Bus (USB), MIDI, or other protocols well known to those skilled in the art; or a parallel bus or wireless link.

Device 12 can include a local microprocessor 110. Local microprocessor 110 can optionally be included within the housing of device 12 to allow efficient communication with other components of the device. Processor 110 is considered local to device 12, where "local" herein refers to processor 110 being a separate microprocessor from any processors in host computer system 14. "Local" also preferably refers to processor 110 being dedicated to haptic feedback and sensor I/O of device 12. Microprocessor 110 can be provided with software instructions (e.g., firmware) to wait for commands or requests from computer host 14, decode the command or request, and handle/control input and output signals according to the command or request. In addition, processor 110 can operate independently of host computer 14 by reading sensor signals and calculating appropriate forces from those sensor signals, time signals, and stored or relayed instructions selected in accordance with a host command. Suitable microprocessors for use as local microprocessor 110 include lower-end microprocessors as well as more sophisticated force feedback processors such as the Immersion Touchsense Processor. Microprocessor 110 can include one microprocessor chip, multiple processors and/or coprocessor chips, and/or digital signal processor (DSP) capability.

Microprocessor 110 can receive signals from sensor 112 and provide signals to actuator 18 in accordance with instructions provided by host computer 14 over bus 20. For example, in a local control embodiment, host computer 14 provides high level supervisory commands to microprocessor 110 over bus 20, and microprocessor 110 decodes the commands and manages low level force control loops to sensors and the actuator in accordance with the high level commands and independently of the host computer 14. This operation is described in greater detail in U.S. Pat. Nos. 5,739,811 and 5,734,373, both incorporated herein by reference in their entirety. Herein, the term "haptic sensation" or "tactile sensation" refers to either a single force or a sequence of forces output by the actuator 18 which provide a sensation to the user. For example, vibrations, a single jolt, or a texture sensation are all considered tactile sensations. The microprocessor 110 can process inputted sensor signals to determine appropriate output actuator signals by following stored instructions. The microprocessor may use sensor signals in the local determination of forces to be output on the user object, as well as reporting locative data derived from the sensor signals' to the host computer.

In yet other embodiments, other hardware can be provided locally to device 12 to provide functionality similar to microprocessor 110. For example, a hardware state machine incorporating fixed logic can be used to provide signals to the actuator 18 and receive sensor signals from sensors 112, and to output tactile signals.

In a different, host-controlled embodiment, host computer 14 can provide low-level force commands over bus 20, which are directly transmitted to the actuator 18 via microprocessor 110 or other circuitry. Host computer 14 thus directly controls and processes all signals to and from the device 12, e.g. the host computer directly controls the forces output by actuator 18 and directly receives sensor signals from sensor 112 and input devices 118. Other embodiments may employ a "hybrid" organization where some types of forces (e.g. closed loop effects) are controlled purely by the local microprocessor, while other types of effects (e.g., open loop effects) may be controlled by the host.

Local memory 122, such as RAM and/or ROM, is preferably coupled to microprocessor 110 in device 12 to store instructions for microprocessor 110 and store temporary and other data. In addition, a local clock 124 can be coupled to the microprocessor 110 to provide timing data, similar to system clock 102 of host computer 14.

Sensors 112 sense the position or motion of the device (e.g. the housing or a manipulandum) in degrees of freedom and provides signals to microprocessor 110 (or host 14) including information representative of the position or motion. Sensors suitable for detecting motion include digital optical encoders, other optical sensor systems, linear optical encoders, potentiometers, optical sensors, velocity sensors, acceleration sensors, strain gauge, or other types of sensors can also be used, and either relative or absolute sensors can be used. Optional sensor interface 114 can be used to convert sensor signals to signals that can be interpreted by the microprocessor 110 and/or host computer system 14, as is well known to those skilled in the art.

Actuator(s) 18 transmits forces to the housing, manipulandum, buttons, or other portion of the device in response to signals received from microprocessor 110 and/or host computer 14. Device 12 preferably includes one or more actuators which are operative to produce forces on the device 12 (or a component thereof) and haptic sensations to the user. The actuator(s) are "computer-controlled", e.g., the force output from the actuators is ultimately controlled by signals originating from a controller such as a microprocessor, ASIC, etc. The present invention is primarily intended for use with active actuators such as DC motors, but may be used with a variety of types, such as voice coil actuators, moving magnet actuators, pneumatic/hydraulic actuators, solenoids, speaker voice coils, piezoelectric actuators, passive actuators (brakes), etc. Actuator interface 116 can be optionally connected between actuator 18 and microprocessor 110 to convert signals from microprocessor 110 into signals appropriate to drive actuator 18. Interface 116 can include power amplifiers, switches, digital to analog controllers (DACs), analog to digital controllers (ADCs), and other components, as is well known to those skilled in the art.

Other input devices 118 can be included in device 12 and send input signals to microprocessor 110 or to host 14 when manipulated by the user. Such input devices include buttons, dials, switches, scroll wheels, knobs, or other controls or mechanisms. Power supply 120 can optionally be included in device 12 coupled to actuator interface 116 and/or actuator 18 to provide electrical power to the actuator. or be provided as a separate component. Alternatively, power can be drawn from a power supply separate from device 12, or power can be received across bus 20. Also, received power can be stored and regulated by device 12 and thus used when needed to drive actuator 18 or used in a supplementary fashion.

The interface device 12 can be any of a variety of types; some embodiments are described further below. For example, a manipulandum 34 on the device, such as a joystick handle, a knob, a steering wheel, a trackball, button, etc., is moved by the user and tracked by sensors. The forces from the actuator(s) 18 can be applied to the housing 34 of the device 12, and/or a movable manipulandum 34. Device 12 can also be a gamepad, joystick, steering wheel, stylus, touchpad, spherical controller, finger pad, knob, track ball, or other device, some embodiments of which are described below. Alternatively, a hand-held remote control device used to select functions of a television, video cassette recorder, sound stereo, internet or network computer (e.g., Web-TV™) can be used with the haptic feedback components described herein, or a cell phone, personal digital assistant, etc.

Thermal Protection for Actuators

The present invention is directed to protecting actuators from overheating during operation at stall, which is the primary mode of operation in haptic feedback devices, where the actuator is outputting force in opposition to a user's force on a manipulandum, for example. During normal output of forced by the haptic device, the actuators of the device can overheat if the maximum allowable current is allowed to be commanded through the actuator to provide the desired haptic effects.

The present invention can provide thermal protection for actuators, such as motors, using several different methods, a broad overview of which is presented below:

1. Insert a Positive Temperature Coefficient (PTC) resettable fuse in the current path of the motor. Size the PTC fuse so it "opens" before the motor can be damaged, i.e. when the current increases to the threshold level set by the fuse, the fuse opens to cut the current flow.

2. Power Monitoring: Use thermal testing data to draw an empirical between power and temperature in the actuator, and then monitor and regulate power in the actuator to control temperature and avoid damaging the motor.

3. Measure the actuator coil temperature with a thermocouple on the motor housing, and use a thermal model to predict coil temperature from the housing temperature.

4. Measure actuator coil temperature by measuring the change in resistance of the coil from a calibrated nominal value. This solution requires sensing circuitry for motor current and voltage in order to actively measure the resistance of the coil.

5. Mount a Passive Infrared (PIR) sensor, such as a thermopile or pyroelectric sensor, inside the motor housing to perform non-contact heat sensing of the rotor.

Any of these different approaches can be used. The preferred implementation is a combination of PTC fuse and Power Monitoring (methods 1 and 2 from above), which would in many cases provide the safest solution with the most usable haptic output. Power Monitoring can be used to limit the rate at which motor temperature can increase. The PTC can be used to be sure that, under extended abusive use at high ambient temperatures (or in the case of firmware failure), the motor temperature will not eventually exceed its allowable maximum. The details of the Power Monitoring approach are discussed herein.

Power Monitoring

The power monitoring method of thermal protection of the present invention strikes a balance between the energy, or heat, entering and escaping the actuator system. Power into the system can be expressed in Watts. Energy can be thought of as the sum of power over time, expressed in Watt-seconds. It is assumed that there is some sustainable level of energy input where heat escapes from the motor as quickly as it enters. This energy level can be found experimentally. Then, as long as the energy applied to the motor falls beneath the sustainable level for a given period of time, the motor temperature will not rise. If the energy applied to the motor exceeds the sustainable level, the input must be folded back.

Instantaneous power dissipated in the coil is represented as a function of current at time t:

$$P = I(t)^2 R$$

Energy into the motor in a particular time frame can be expressed by summing instantaneous power over time:

$$E_{in} = \int_n^{n+T} P_{in}(t)\,dt = \int_n^{n+T} I_{in}(t)^2 R\,dt$$

Sustainable current can be found empirically and used to derive sustainable energy:

$$E_{sustainable} = \int_n^{n+T} P_{sustainable}\,dt =$$

$$\int_n^{n+T} I_{sustainable}^2 R\,dt = R\int_n^{n+T} I_{sustainable}^2\,dt = R \cdot I_{sustainable}^2 \cdot T$$

Delivered energy should be less than sustainable energy:

$$\int_n^{n+T} I_{in}(t)^2 R\,dt \le R \cdot I_{sustainable}^2 \cdot T$$

$$R\int_n^{n+T} I_{in}(t)^2\,dt \le R \cdot I_{sustainable}^2 \cdot T$$

$$\int_n^{n+T} I_{in}(t)^2\,dt \le I_{sustainable}^2 \cdot T$$

$$\frac{\int_n^{n+T} I_{in}^2(t)\,dt}{T} \le I_{sustainable}^2$$

The final equation reveals that current averaged over the time period must fall below sustainable current. Otherwise current into the motor must be ramped back, regardless of the requested current (i.e., requested by a controller such as a microprocessor to output a desired haptic effect).

A broad method for controlling a motor over the standard sustainable current level for brief periods of time is described in copending provisional patent application No. 60/182,557, filed Feb. 15, 2000, and is incorporated herein by reference.

The goal of the Power Monitoring method of the present invention is to ensure that sustainable power is not exceeded. If a request to output one or more forces would cause the "energy budget" for the motor to be exceeded, the request cannot be honored as it stands; instead it must somehow be reduced. The way in which a request is reduced is critical to providing high fidelity, graceful and realistic haptic sensations. The method provided here regulates energy into the system while maintaining realistic haptic sensations.

First, certain boundaries and terms are defined to aid in describing the method:

Imax is the maximum possible current that can be driven through the motor. Imax is usually a function of the power supply and power amplifier connected to the motor, and is chosen to accommodate the torque output (or other force output) in the design specification. Imax cannot be sustained indefinitely; if it is driven too long, the motor can become damaged.

Isustainable is the current which can be applied to the winding of the motor forever, where the winding temperature will climb to a safe asymptote.

Ifoldback is the "Imax" when the system is in a reduced-force state while trying to limit energy input. Ifoldback is a design parameter in this method, and later we will dynamically set Ifoldback as a function of the energy in the system.

Emax is the energy that corresponds to the area under the power curve $I_{max}^2 R$ over time, and represents the "energy budget" allowed to be used in the motor system under the present invention.

Ewarning is an energy level that is a design parameter that is used to dynamically regulate Ifoldback.

Ibound, or Bound Iin, is the current boundary level or envelope set by the present invention to regulate actuator temperature. Ibound may be set at Imax, or may be set lower to limit the current in the actuator and allow the actuator temperature to cool. The lowest level Ibound need be set at is Isustainable since actuator temperature is always safe at that level.

Figure 2:
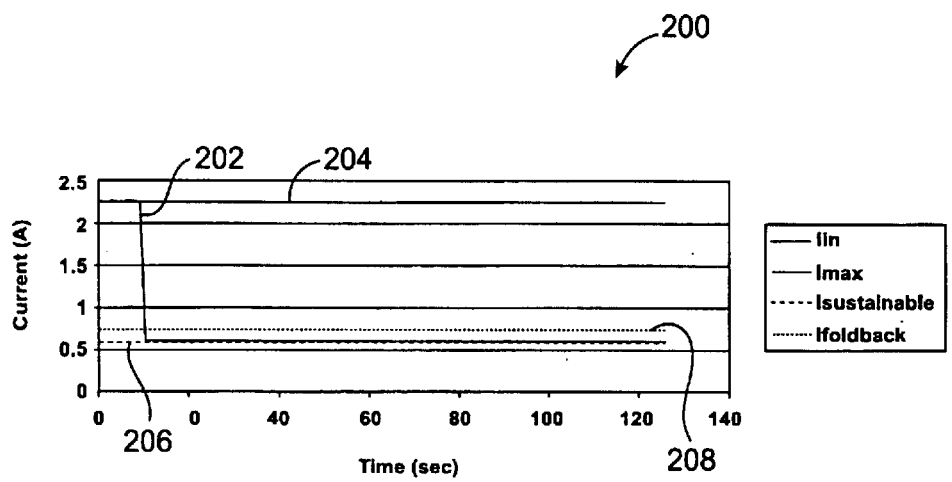
FIG. 2 is a graph illustrating the current in a DC motor over time, and showing a constant request for maximum force ramped back according to the present invention when an energy budget is exceeded.

Folding back the current through the motor is done to ensure that sustainable energy is not exceeded within any period T. The instantaneous power is allowed to exceed the sustainable power, but not on the average. FIG. 2 is a graph 200 illustrating the current in a typical DC motor over time, and presenting a simple case where, when the energy budget is exceeded, the constant request for maximum force is ramped back (current I is proportional to the magnitude of output force of the motor; current is commonly input to motors using pulse width modulation (PWM) techniques, as is well known to those skilled in the art).

Thus, in this case, Iin drops to Ifoldback. Iin (curve 202) initially starts out at the level of Imax (curve 204), but once the energy budget is exceeded, Iin is dropped to the level of Ifoldback (curve 206), which is shown to be below Isustainable (curve 208). Ifoldback is chosen to be less than Isustainable so that the additional energy in excess of the sustainable energy is recouped later in time. In other words, the sum of energy in excess of the sustainable energy limit in the first 10 seconds (in the example of FIG. 2) must be equal to the sum of energy under the sustainable energy limit for the remainder of the period T. The longer that the period T is made, the more excess energy can be input to the system. In the examples shown herein, a period of about 128 seconds is demonstrated.

Figure 3:
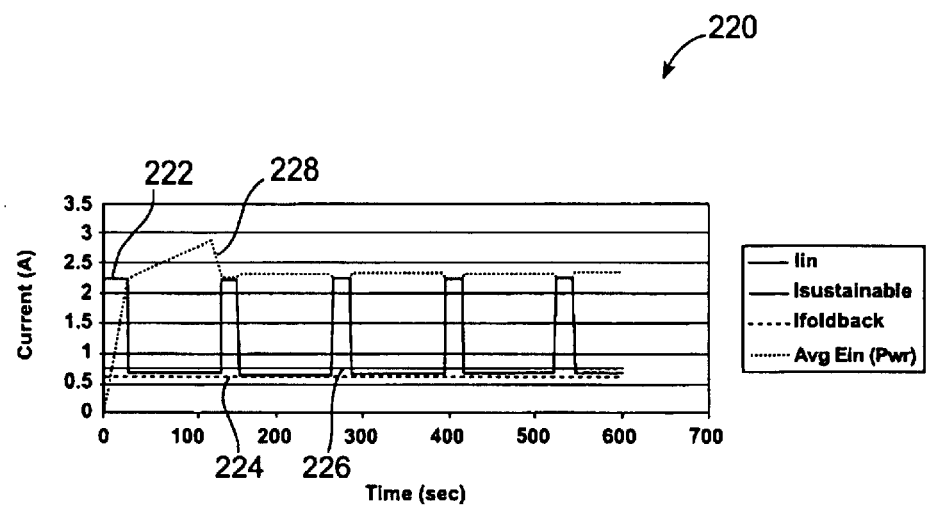
FIG. 3 is a graph illustrating an energy balance of the present invention in action over time in a typical motor.

FIG. 3 is a graph 220 illustrating the energy balance in action over time in a typical motor. Iin (curve 222) is input at a high current, then dropped to the Ifoldback level (curve 224) for recurring periods of time, where the Ifoldback level is below the Isustainable level (curve 226). The average energy Avg Ein (power) in the system is shown as curve 228. Average energy in the system is reduced while Iin is at the foldback level, allowing the current Iin and thus output forces to rise back to the maximum level (Imax) for brief periods of time before protection is reinstated and the current drops again to the foldback level.

If Ifoldback is set further below Isustainable, more energy is reclaimed in each time slice. Then, forces can ramp back to maximum sooner. However, as Ifoldback decreases, foldback forces will be weaker and weaker until haptic sensations are imperceptible in foldback mode. In the present invention, a preferred implementation folds back forces to no less than Isustainable (so that Ifoldback=Isustainable). This can seem risky, but, in the worst case, temperature will settle to the temperature dictated by Isustainable, and in the average case only a fraction of the area under the sustainable power curve will be consumed by required forces (though this depends on the user and the application). The drawback of setting Ifoldback as high as Isustainable is that the energy budget may be exceeded in the short term, causing higher peak temperatures in the actuator coil.

Figure 4:
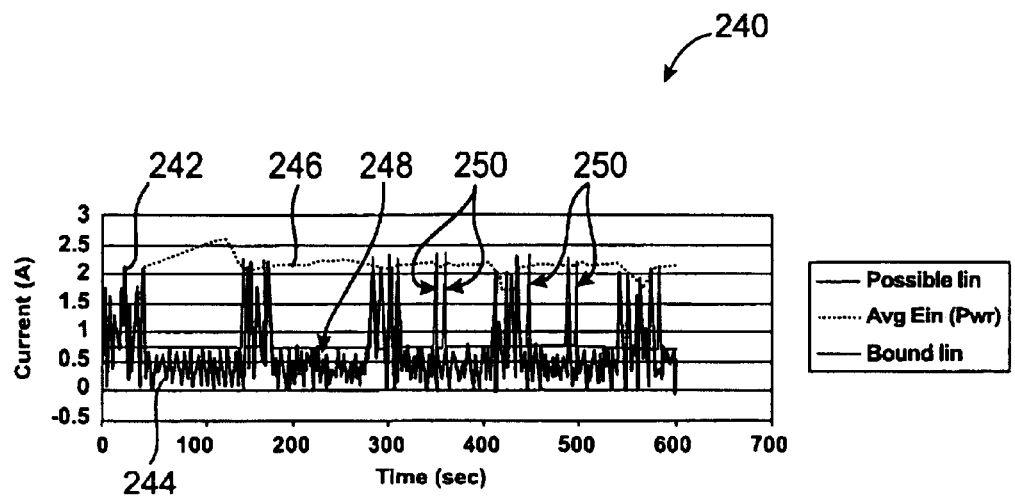
FIG. 4 is a graph illustrating a possible input current and spikes that can result from the method of FIG. 3.

FIG. 4 is a graph 240 illustrating some problems in the above-described method. Ibound (or "Bound Iin") (curve 242) is an envelope that constrains the requested input current level to either Imax or Isustainable. Possible Iin is a randomly-generated curve 244 that represents one possible input current that fluctuates due to user input and forces on the manipulandum of the interface device, causing output forces to fluctuate in response. Possible Iin has been scaled to be within the range set by Ibound. The average energy Avg Ein in the system is shown as curve 246.

One problem is the force discontinuity that occurs during normal use when transitioning to and from foldback mode, i.e. the regularly-spaced steps that occur due to exceeding the energy budget. The sharp edges of the Ibound curve provide jumps in force output magnitudes which are readily discernible to the user of the haptic feedback device, and which do not create a realistic haptic sensation.

Another problem manifests itself as occasional spikes caused by discontinuities in the input current and which are allowed to rise to higher levels due to energy reclamation. For example, an "energy window" can be envisioned which has a length of the period T. The energy window portrays the total amount of energy that is allowed to be input to the motor. As the energy window moves in time, the energy level coming into the window (which is proportional to the presently-commanded current) has a maximum dependent on how much energy has left the window, since the maximum energy is limited by the energy budget maximum. For example, if a long period of relatively higher current levels leaves the window, then a large amount of room has opened up in the energy budget, and the current level input to the motor can be increased to a higher level.

A relatively long period of higher "bursts" of discontinuities 248 (as shown in FIG. 4) in the input current may take up a large amount of energy in the energy budget, so that when these bursts leave the moving energy window, a lot of room is opened in the energy budget, allowing the boundary current (Ibound) to be raised to the level of Imax. A higher Ibound value is shown as spikes 250 in FIG. 4. Since Ibound is larger, the requested input current can be raised higher. Once the input current is raised high enough, the energy budget is exceeded, and the requested input current is forced back down to the foldback level. This can happen very quickly, as shown by the thinness of the spikes 250. These discontinuities and spikes can be very noticeable to the user of the haptic device as changes in output force magnitude.

To reduce the spikes 250 caused by the bursts and discontinuities, hysteresis can be added to the control method to smooth the output. For example, below the maximum energy (Emax) level, an energy threshold Ethr can be established. When the average energy level is moving downward below Emax, the input current Iin and Ibound would normally be increased. However, when using hysteresis, Iin and Ibound are only begun to be increased after the energy level falls below the lower energy threshold Ethr. This provides some "play" so that the current is not immediately increased when energy is available in the energy budget, and is increased only after a sustained decrease in energy levels occurs.

The hysteresis method described above can be effective in reducing the spikes 250 in current levels and force output, but does not eliminate the disconcerting transitions caused by changing currently levels from the Imax level to the Ifoldover level, and vice versa, as shown in FIG. 4. Another method eliminates these disconcerting transitions as well. In a preferred method of the present invention, instead of making a sharp transition from Imax to Ifoldback, the current can be ramped gradually as a function of the energy by which it has exceeded some predetermined budget. For example, a threshold value Ewarning can be established as a percentage of Emax, e.g., 75% of Emax. As the energy in the system exceeds Ewarning, Iin and Ibound are then reduced as a function of the energy by which Ewarning has been exceeded, until the current has been reduced to Isustainable at Emax.

Figure 5:
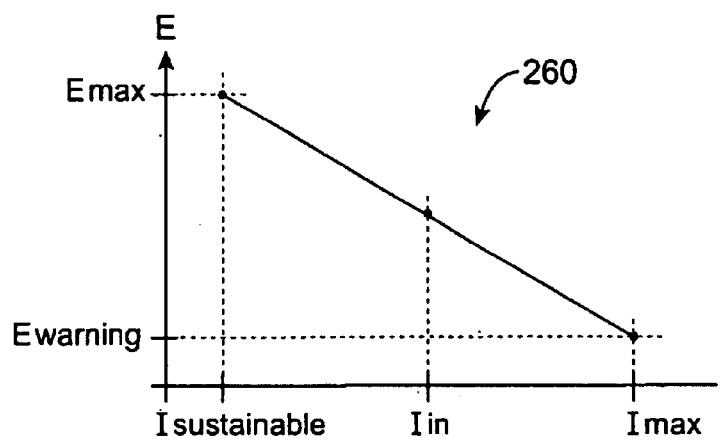
FIG. 5 is a graph illustrating a relationship between energy and input current of the present invention.

FIG. 5 is a graph 260 showing a relationship of the present invention between energy and input current. This graph shows where the input current should be to achieve a particular energy level in the system. At an energy of Ewarning (or below), the Ibound level should be at Imax, and at an energy of Emax, the Ibound level should be at Ifoldback (which is equal to Isustainable in the described embodiment). Thus, as energy decreases from Emax, more current above the Ifoldback level is allowed to be commanded in the motor, until Emax is again reached.

The current is preferably adjusted according to the following relationship:

$$I = I_{max} - \frac{E - E_{warning}}{E_{max} - E_{warning}}(I_{max} - I_{sustainable}) \quad (1)$$

where I is the present current to be commanded (Iin), and E is the present energy in the system, determined by the previous current delivered to the motor. This relationship reduces I by the amount of current that has exceeded Isustainable so that the energy in the system stays within desired limits.

Figure 6:
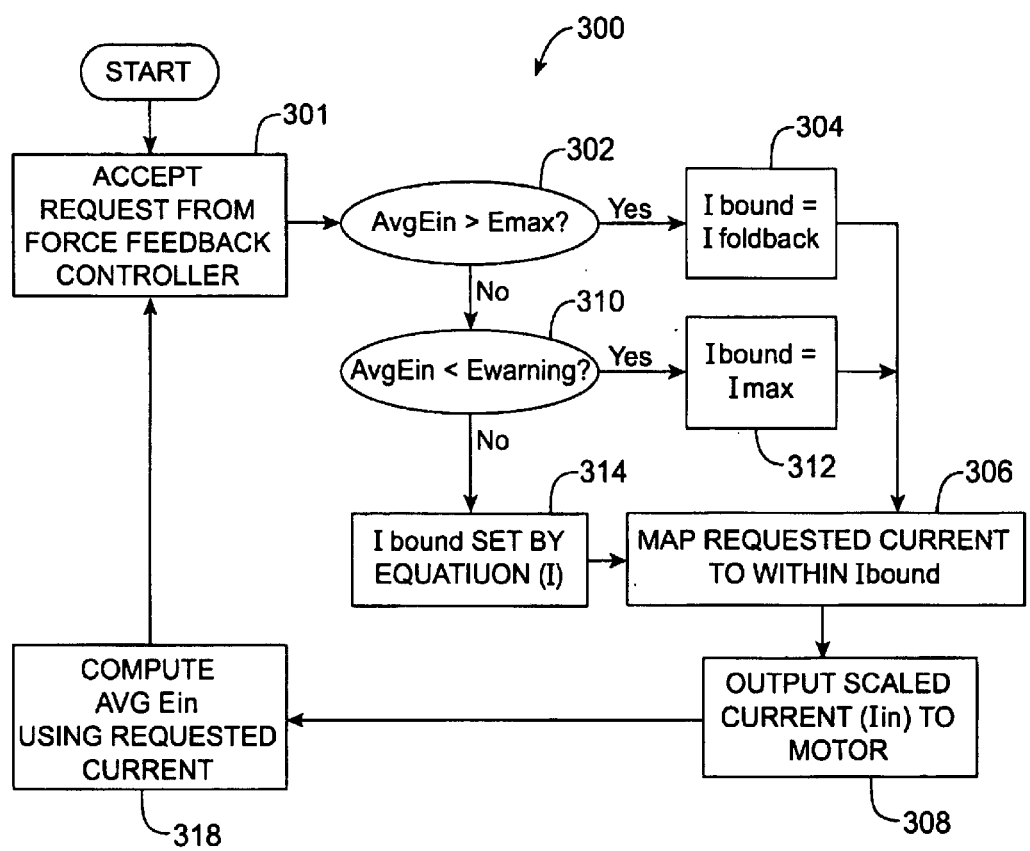
FIG. 6 is a flow diagram illustrating a method of the present invention of providing thermal protection to actuators.

FIG. 6 is a flow diagram illustrating a preferred method of the present invention, and uses the "scaling relationship" described above. This method can be implemented by a local microprocessor on the haptic feedback device, or other processor in the haptic feedback system.

In step 301, a request is accepted by the motor controller from a force feedback controller (such as a microprocessor, an actuator interface, force feedback control software, etc.). The request is a specific command to output a particular force level. For example, the request can be stated as a percentage of full output of the motor, and can range from 0 to 100%. The force feedback controller has previously determined what force level should be output based on particular criteria and conditions. In many cases involving overheating of motors, these conditions include the position of a manipulandum as affected by a user. For example, a barrier force provides a resistive force to a manipulandum that is moved "against" the barrier, i.e. if a knob is rotated to a position designated to have a barrier, then a force resisting motion into that position is output by the motor. The further that the user rotates the knob into the barrier, the greater the resistance force magnitude.

After receiving the request in step 301, then in step 302, it is checked whether the average energy in the system (Avg Ein) is greater than the maximum energy allowed, Emax. The Avg Ein value is obtained in a step 318, described below. In some embodiments, the energy in the system can be approximated by using the current in the motor, since energy is proportional to current in the motor based on the relationship $\Sigma E=I^2R$ for a particular time period. More exact determinations of energy can also be used. If Emax has been exceeded, then in step 304, the current envelope (boundary) Ibound is set equal to Ifoldback to cause a reduction of energy in the system. As explained above, in one described embodiment, Ifoldback is equal to Isustainable. The lower Ibound value for the current will cause the energy in the system to drop back to safe levels, thus preventing overheating of the motor. After step 304, the process continues to step 306, in which the requested command received in step 301 is mapped to the Ibound value found in the preceding steps, such as step 304. For example, the range of the requested current can be scaled down to the range as determined by Ibound, with Ibound as the maximum value; e.g., if an 80% request is made, this request is scaled to the Ibound range. In next step 308, the scaled current is output to the motor so that a force (e.g. a torque in a rotary motor) is output to the user contacting the manipulandum of the interface device. The process then continues to step 318, detailed below.

If in step 302 the Avg Ein is not greater than Emax, then in step 310 it is checked whether Avg Ein is less than Ewarning, the threshold value earlier established. If so, then in step 312 Ibound is set equal to the maximum current that can be commanded in the motor, Imax. Thus, if Avg Ein is less than Ewarning, no scaling back of current is necessary, since any energy in the motor under Emax is allowed and safe for operation. The process then continues to step 306 to scale the requested current to Ibound, and the scaled current is sent to the motor in step 308. The process then continues to step 318, detailed below.

If Avg Ein is not less than Ewarning in step 310, i.e. if the average current is between Emax and Ewarning, then step 314 is initiated, in which Ibound is scaled down according to the scaling relationship (equation (1)) described above. As indicated in FIG. 5, when the energy is between Emax and Ewarning, the current is scaled to an appropriate level based on that energy. After step 314, the process continues to step 306 to scale the requested current to the range set by Ibound, and the scaled current is output to the motor in step 308. Step 318 is then initiated.

Figure 7:
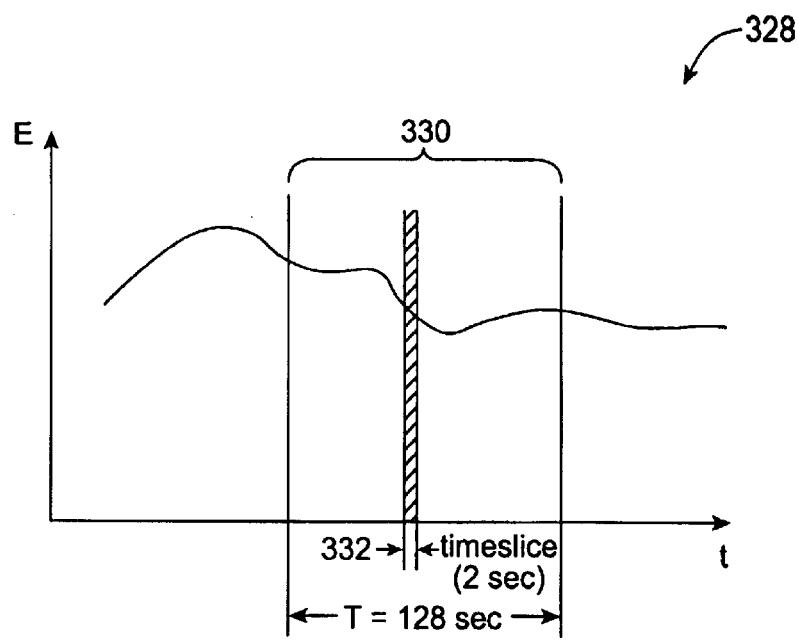
FIG. 7 is a graph illustrating an energy window used to determined average energy.

In step 318, Avg Ein for the motor is computed based on the requested current received in step 301. As shown in the graph 328 of FIG. 7, in the described embodiment, the average energy is determined using a moving "energy window" as explained above. The energy window 330 has a width equal to a desired period T (e.g., 128 seconds). The Avg Ein is the energy in the motor within the time period T. The energy window is moved by a predetermined short amount of time 332 ("time slice") to find the next energy value (and discard the time slice at the rear end of the energy window). The length of the timeslice is practical for energy evaluation; for example, in one embodiment, the timeslice is two seconds (the energy in the motor over the two seconds is averaged to find a single value for the 2-second timeslice). Thus, the window is moved in increments of the time slice (two seconds), where a new Avg Ein is computed at the new position of the window. In step 318 of FIG. 6, the window is moved by one time slice increment and the new Avg Ein is computed. Previous energy (or current) levels can be stored in a memory device to determine the average energy over the full time period T. In some embodiments, the energy can be approximated by the current in the motor as explained above, so that the computation of average energy in step 318 is actually the computation of average current within the time window 330.

After step 318, the process returns to step 301 to accept another request from the force feedback controller. Ibound is determined from any of steps 304, 312, and 314, and then a new Avg Ein is computed from the requested current most recently received from step 301.

Figure 8:
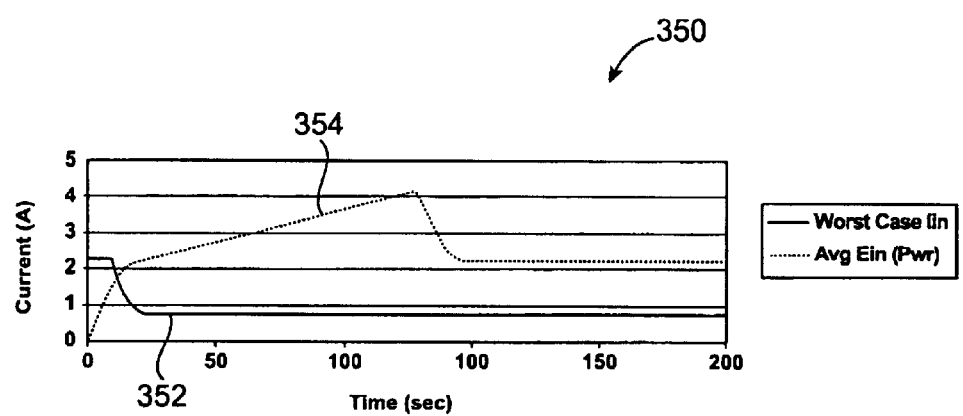
FIG. 8 is a graph illustrating a simulation of a ramping down of current according to the present invention.

FIG. 8 is a graph 350 illustrating a simulation of the above-described method, in which the "worst case Iin" (a request for 100% magnitude forces), shown as curve 352, is ramped down more gradually than the situation described above for FIG. 3 or 4, in which a sharp transition is made. The average power Avg Ein is shown as curve 354.

Figure 9:
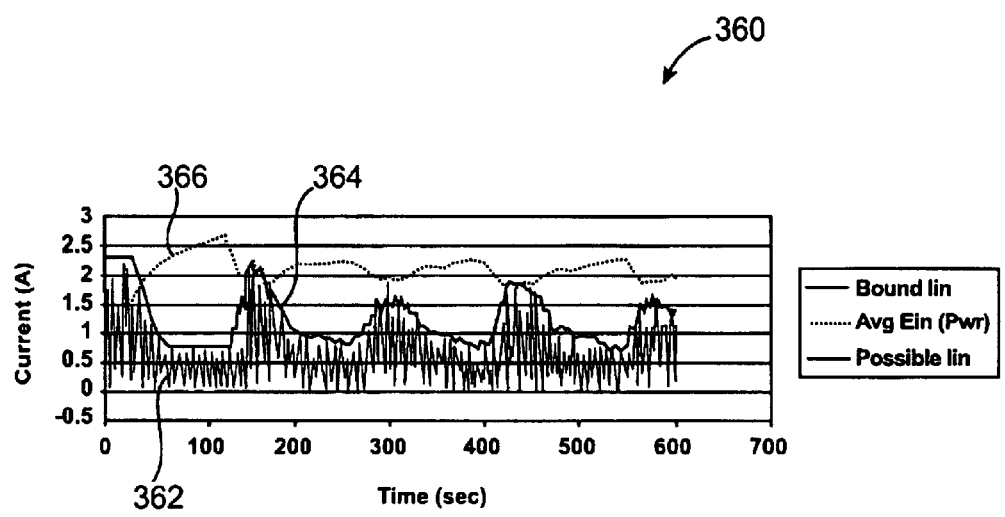
FIG. 9 is a graph illustrating a bounded current of the present invention when a random input current is provided in the actuator.

FIG. 9 is a graph 360 showing results when providing a random and discontinuous input current Possible Iin (curve 362) and applying the above-described method, where delivered force (e.g. torque) is less than requested force current. The current is limited to the level Ibound (curve 364) providing a clean foldback current result that is substantially ramped between maximum outputs and conceals the jumps into thermal protection mode. This prevents the harsh transitions shown in earlier methods and is much more appealing to the user of the device. The average power Avg Ein is shown as curve 366.

For some motors or embodiments, at elevated operating temperatures a motor could be in danger of exceeding the coil temperature specification (e.g., 120° C.) when a relatively higher Ifoldback is used. A lower Isustainable or Ifoldback current setting can therefore be chosen if the temperature increase will be a problem.

It should also be noted that, in a multiaxis or multi-degree-of-freedom interface device having a motor associated with each axis or degree of freedom, the current can be reduced in all of the multiple motors proportionally, where the maximum current is established by the one motor currently operating with the most energy.

The method of thermal protection works almost transparently to protect a motor of a haptic feedback device from over-temperature conditions. One problem is that the method is not theoretically bounded; temperature can creep up over time to eventually damage the motor coil. Parameters can be set so that, at normal temperatures, temperature will plateau at a safe level. However, for extended worst-case input (e.g., more than 30 minutes or so) in elevated operating temperatures (e.g., more than 60° C.), the coil can be expected to reach a dangerous temperature level. Safer current levels can therefore be used, depending on intended applications. Also, other protection methods, such as the PTC fuse method mentioned in the background section, can be used in conjunction with the power monitoring method of the present invention to provide a more complete and robust actuator heat management scheme.

While this invention has been described in terms of several preferred embodiments, it is contemplated that alterations, permutations and equivalents thereof will become apparent to those skilled in the art upon a reading of the specification and study of the drawings. For example, many different types of haptic sensations can be provided with the actuators of the present invention. Furthermore, certain terminology has been used for the purposes of descriptive clarity, and not to limit the present invention. It is therefore intended that the following appended claims include alterations, permutations, and equivalents as fall within the true spirit and scope of the present invention.

What is claimed is:

1. A method comprising:
supplying current to an actuator configured to provide a haptic force to a haptic-feedback device;
calculating an average energy input to the actuator over a predetermined period of time; and
reducing a maximum allowable current level in the actuator if the average energy input to the actuator exceeds a predetermined warning energy level.

2. The method of claim 1, wherein the average energy input to the actuator is calculated by repeatedly moving an energy window by a predetermined timeslice and determining an intermediate average energy within the energy window after each of said movements.

3. The method of claim 1, wherein the reducing the maximum allowable current level includes reducing the maximum allowable current level to a first current level if the average energy input to the actuator reaches the predetermined warning level, the first current level being associated with steady state operation.

4. The method of claim 1, wherein the reducing the maximum allowable current level includes reducing the maximum allowable current level to a first level below a second current level if the average energy input to the actuator reaches the predetermined warning level, the second current level being associated with steady state operation.

5. The method of claim 1, further comprising raising the maximum allowable current level in the actuator after the maximum allowable current level has been reduced if the average energy input to the actuator is below the predetermined warning energy level.

6. The method of claim 1, wherein the reducing includes reducing the maximum allowable current level gradually as a ramp function.

7. The method of claim 6, wherein the maximum allowable current level is reduced as a function of the energy by which the predetermined warning energy level has been exceeded.

8. A method as recited in claim 1, further comprising:
determining a current in the actuator, the average energy input to the actuator being calculated based on the current in the actuator.

9. The method of claim 1, wherein the calculating and the reducing are performed by a microprocessor local to the haptic feedback device.

10. The method of claim 1, further comprising sensing current with a positive temperature coefficient (PTC) resettable fuse in a current path of the actuator, the fuse being configured to open so that a flow of the current is disrupted when the current increases to a fuse threshold level.

11. The method of claim 1, wherein the actuator is a DC motor.

12. An apparatus comprising:
a sensor configured to send a signal associated with a movement of a haptic-feedback device;
an actuator coupled to the haptic-feedback device and configured to output a haptic-feedback; and
a controller coupled to the actuator and configured to calculate an average energy input to the actuator over a predetermined period of time, the controller configured to reduce the maximum allowable current level in the actuator if average energy input to the actuator exceeds a predetermined warning energy level.

13. The apparatus of claim 12, wherein the controller is configured to calculate the average energy input to the actuator by repeatedly moving an energy window by a predetermined timeslice and calculating an intermediate average energy input to the actuator within the energy window after each of said movements.

14. The apparatus of claim 12, wherein the actuator is configured to reduce the maximum allowable current level to a first current level if the average energy input to the actuator reaches the predetermined warning level, the first current level being associated with steady state operation.

15. The apparatus of claim 12, wherein the actuator is configured to reduce the maximum allowable current level to a first level below a second current level if the average energy input to the actuator reaches the predetermined warning level, the second current level being associated with steady state operation.

16. The apparatus of claim 12, wherein the controller in configured to increase the maximum allowable current level in the actuator after the maximum allowable current level has been reduced if the average energy input to the actuator is below the predetermined warning energy level.

17. The apparatus of claim 12, wherein the controller is a microprocessor local to the haptic feedback device.

18. The apparatus of claim 12, further comprising a positive temperature coefficient (PTC) resettable fuse disposed in a current path of the actuator, the fuse being configured to open such that a flow of the current is disrupted when the current increases to a fuse threshold level.

19. The apparatus of claim 12, wherein the at least one actuator is at least one DC motor.

20. A method, comprising:
supplying current to an actuator of a haptic-feedback device such that the haptic-feedback device provides haptic feedback;
calculating an average energy input to an actuator over a predetermined period of time;
reducing a maximum allowable current level in the actuator if the average energy input to the actuator exceeds a predetermined warning energy level; and
increasing the maximum allowable current level in the actuator if the average energy input to the actuator is below the predetermined warning energy level, the maximum allowable current level is not above a current level allowed by the actuator.

21. The method of claim 20, wherein the average energy input to the actuator is calculated by repeatedly moving an energy window by a predetermined timeslice and determining an intermediate average energy input to the actuator within the energy window after each of the movements.

22. The method of claim 20, wherein the actuator is configured to reduce the maximum allowable current level to a first current level if the average energy input to the actuator reaches the predetermined warning level, the first current level being associated with steady state operation.

23. The method of claim 20, wherein the maximum allowable current level is increased gradually as a ramp function.

24. The method of claim 20, wherein the maximum allowable current level is increased as a function of difference between the average energy input to the actuator and the predetermined warning energy level.

* * * * *